(12) United States Patent
Liedes et al.

(10) Patent No.: US 8,001,084 B2
(45) Date of Patent: Aug. 16, 2011

(54) MEMORY ALLOCATOR FOR OPTIMISTIC DATA ACCESS

(75) Inventors: Antti-Pekka Liedes, Espoo (FI); Petri Uolevi Soini, Vantaa (FI)

(73) Assignee: International Business Machines Corporation, Armonk, NY (US)

(*) Notice: Subject to any disclaimer, the term of this patent is extended or adjusted under 35 U.S.C. 154(b) by 501 days.

(21) Appl. No.: 12/121,133

(22) Filed: May 15, 2008

(65) Prior Publication Data
US 2009/0287735 A1 Nov. 19, 2009

(51) Int. Cl.
*G06F 17/30* (2006.01)
(52) U.S. Cl. .......... 707/638; 707/785; 707/999.009
(58) Field of Classification Search .......... 707/638, 707/785, 999.009, 999.101, 999.203, 999.205, 707/999.201; 719/312, 313
See application file for complete search history.

(56) References Cited

U.S. PATENT DOCUMENTS

| 7,748,009 B2 * | 6/2010 | Talluri et al. | 719/313 |
| 2007/0239943 A1 * | 10/2007 | Dice et al. | 711/147 |

* cited by examiner

*Primary Examiner* — Marc Filipczyk
(74) *Attorney, Agent, or Firm* — Patterson & Sheridan, LLP (57) ABSTRACT

A method, system and computer readable media for optimistic access of data objects in a processing system. The method, system and computer readable media comprise providing a list of position objects. Each of the position objects can be associated with a data object. The method, system and computer readable medium include utilizing a thread to mutex a position object of the list of position objects and to associate the position object with a data object, and accessing the data object by the thread. The method, system and computer readable medium record a free level of a memory allocator as a read level of the position object and record a version number of the data object as the version number of the position object after the access has been determined to be safe.

17 Claims, 7 Drawing Sheets

MEMORY ALLOCATOR FOR OPTIMISTIC DATA ACCESS

FIELD OF THE INVENTION

The present invention relates generally to software systems with parallel access and more particularly to accessing data in such a software system.

BACKGROUND OF THE INVENTION

In systems in which high multiprocessor scalability is desired, such as a main-memory database management system (DBMS), the process execution is divided into a number of threads, each of which can be run on a different processor within the multiprocessor system. These threads access a set of data objects, which form the data and metadata of the system. A single data object is, for example, a single row in the database, or a node in a B-tree used to index the rows.

In the context of a single operation, like reading or updating a row, a thread is either a reader or a writer. A reader only reads a set of data objects, a writer will read a set of data objects and modify (write) at least one of them.

When a writer updates a data object, and either another writer or a reader reads the same data object at the same time, a method for retaining the consistency of the simultaneous operations is needed. A typical method for maintaining consistency is relating a mutual exclusion lock (mutex) on a data object whenever a reader or a writer accesses it. However, this limits concurrent access on a single data object to one reader or writer at a time.

In a more refined method that uses optimistic reads, only the writers mutex the data objects they access, and the readers rely on version numbers to verify their reads on the data objects. When a writer updates a data object, it acquires a mutex on the object, then increases the object's version number by one to an odd number, performs the necessary changes to the data object, increases the data object's version number again to an even number, and releases the mutex. When a reader reads a data object, the reader first determines the version number of the data object, then performs the read, and finally rechecks the version number of the data object. If the version number is still the same as the first time when the data object is first read, and the version number is even, then the read was successful. Otherwise, reading of the data object is attempted again.

This method of optimistic reads allows any number of readers to access a data object simultaneously, increasing the multiprocessor scalability. However, there is one special case of an update operation, namely freeing a data object, which cannot be covered by the aforementioned version numbering.

Traditionally, using a classic memory allocator (malloc), any piece of freed memory may become inaccessible immediately. Using malloc would thus render access to data objects that might be freed by a writer to be unsafe. For example, in a UNIX system, reading a freed piece of memory may result in a segmentation fault.

A first method to ensure consistency is to use reference counts on data objects; whenever a thread accesses a data object, it increases the data object's reference count by one, and when the access finishes, the reference count is again decreased by one. When a data object is freed, the freeing thread waits for the reference count to drop to zero before actually freeing the data object. The problem with this method is that the reference count must be protected, typically by a mutex, which again limits the concurrency of both reads and writes to the data object.

Finally, a second method to ensure consistency is to use a garbage collector. A garbage collector is a process that cleans up unused memory at times. In a system that utilizes a garbage collector, any references to a data object may be left lingering, and after the final reference to a data object is released, the garbage collector will sooner or later free the data object. Disadvantages of garbage collectors are that they typically limit access to the data objects while processing them, introducing a new source of mutexing, thereby limiting the multiprocessor scalability and responsiveness of the system.

SUMMARY OF THE INVENTION

A method, system and computer readable media for optimistic access of data objects in a processing system. The method, system and computer readable media comprise providing a list of position objects. Each of the position objects can be associated with a data object. The method, system and computer readable medium include utilizing a thread to mutex a position object of the list of position objects and to associate the position object with a data object, and accessing the data object by the thread. The method, system and computer readable medium record a free level of a memory allocator as a read level of the position object and record a version number of the data object as the version number of the position object after the access has been determined to be safe.

DETAILED DESCRIPTION OF PREFERRED EMBODIMENTS

The present invention relates generally to software systems with parallel access and more particularly to accessing data in such a software system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
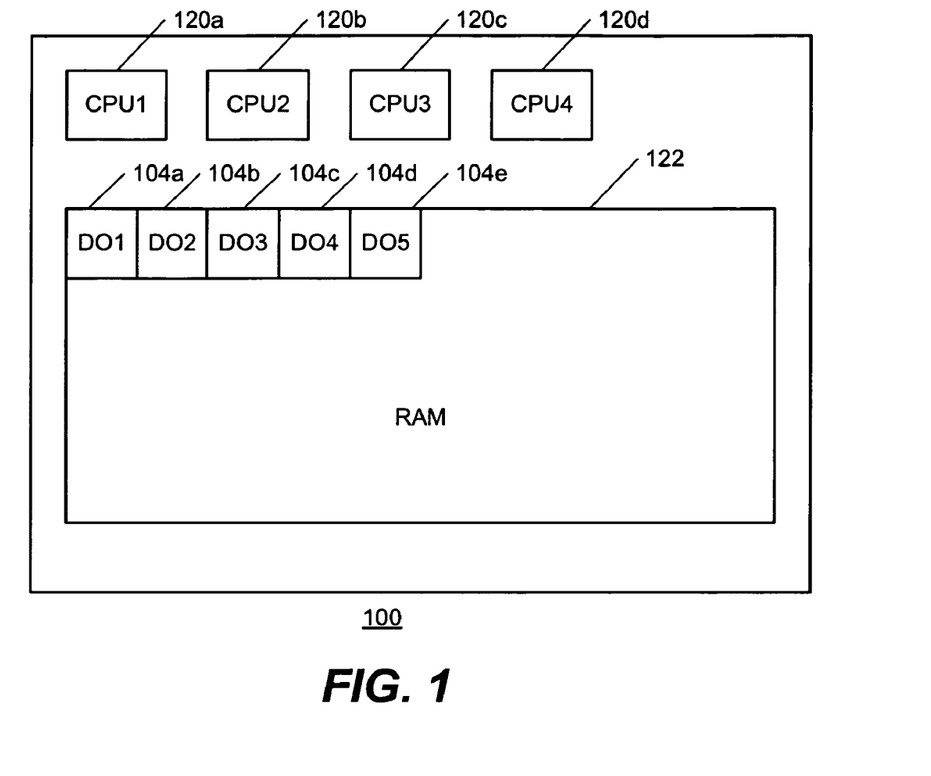
FIG. 1 is a multiscalar processing system in accordance with an embodiment.

FIG. 1 is a multiscalar processor system in accordance with an embodiment. The multiscalar processor system 100 includes in this embodiment a plurality of central processing units (CPUs) 120a-120d and a random access memory RAM 122. The RAM 122 includes a plurality of data objects 104a-104e. The data objects 104a-104e can be accessed by any of the CPUs 120a-120d. As before mentioned, the data objects can be accessed by read threads of the CPUs 120a-120d and write threads of the CPUs 120a-120d.

To address the problem of freeing a data object that is being read simultaneously by another thread, a memory allocator with read levels is provided. All reading and writing of version numbered data objects are pointed to by position objects. A position object in one embodiment includes a pointer pointing to a data object, a version number denoting the last version number of a safe access to the data object, a read level represented by an integer, and a mutex. All position objects are organized into a list, the list having a separate mutex for traversing the list, for adding a position object, or for removing a position object. To access the data objects, a thread will mutex the position object used for the access and access the data object as described above. After the access has been deemed safe, the memory allocator's free level is recorded as the position object's read level, and the data object's version number as the position object's version number. Finally, the position object mutex is released. As different threads have different position objects, this mutexing does not cause collisions. In an embodiment multiple instances of the memory allocator can be utilized that are independent of each other.

A system that utilizes a memory allocator in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, the memory allocator can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W). To describe the features of the present invention in more detail, refer now to the following description in conjunction with the accompanying Figures.

In an embodiment, the memory allocator has a free level counter, which counts in integers. Every time a data object is freed, it is moved to a recycle list and the current free level is recorded on it. The current free level is then increased by one. In addition, its version number has been increased once to make the version number odd, and the version number remains odd while the data object is in the recycle list to denote the data object is not readable at this time. A data object may be allocated for other purposes from the recycle list; in this case, the writer that allocated it will write its new content, and increase its version number by one to make it even, ie, valid for reading again.

Figure 2:
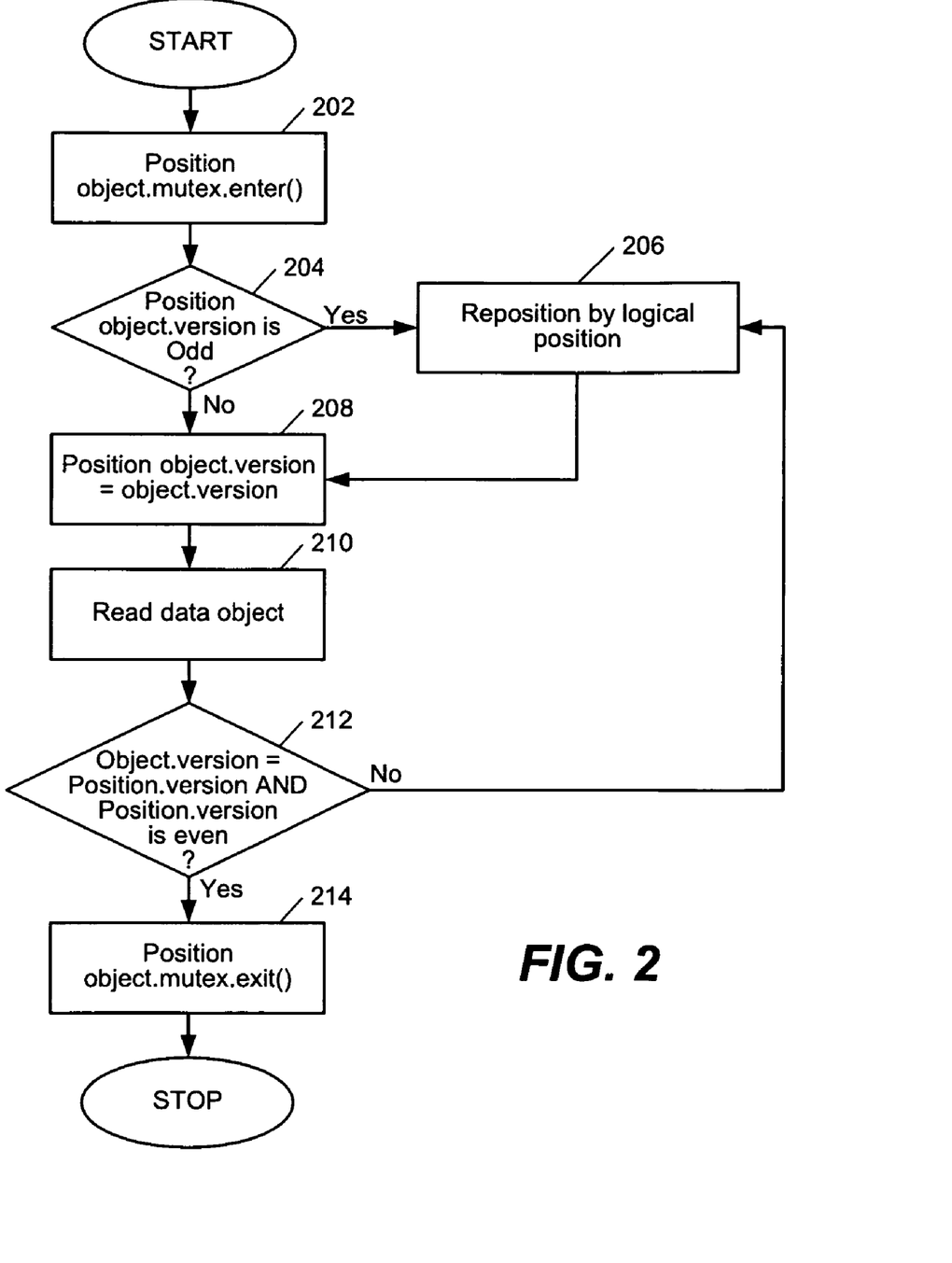
FIG. 2 is a flow chart of the data object read function.

FIG. 2 is a flow chart of a data of a data object read function in accordance with an embodiment. First, the pointer object mutex is entered, via step 202. Next it is determined if the position object version number is odd, via step 204. If the version number is odd, then the data object is repositioned by logical position, via step 206. If the position object version number is even, via step 304 or repositioned, via step 206, then the position object version number is equal to the data object version number, via step 208. Thereafter the data object is read via step 210. Next it is determined if the data object version number is equal to the positioned object version number and whether the position object version number is even, via step 212. If the answer is no, then return to step 206. If the answer is yes, then the position object mutex is exited, via step 214.

At certain intervals, for example, after a predetermined number of frees, for example, 1000, the position object list is mutexed and traversed. During the traversal, each position object's read level is checked and the minimum read level of all positions objects is recorded. Reading the read level of a position object is an atomic operation and requires no mutexing. After traversing the position object list, all data objects in the recycle list having free levels lower than the minimum read level just discovered can be removed from the recycle list and freed to the underlying system. This way, no data object that still has a position object pointing to it is freed to the system, and validity of access to the data objects is retained. This procedure is referred to as purging the recycle list.

Whenever a position object is used to continue access to the data object pointed to by it after a pause, to, for example, pass search results to a user, the position object's version number is compared with the version number of the current version number of the pointed data object. If the version numbers do not match, the position object is logically repositioned by using a key value or other such information. What is meant by key value is the logical position of the data object in memory. If the version numbers match, the position object is free to continue accessing the data object with the protocol described above.

It is possible that a position object remains for a long time on a free level, such that the release of a large number of data objects in the recycle list is prevented. If, during the position object list traversal described above, a position object's read level is deemed to be too far behind the current read level, the position object is forcibly invalidated by setting its version number to 1, which is odd and thus always invalid, and its read level is ignored when determining the lowest read level.

Figure 3:
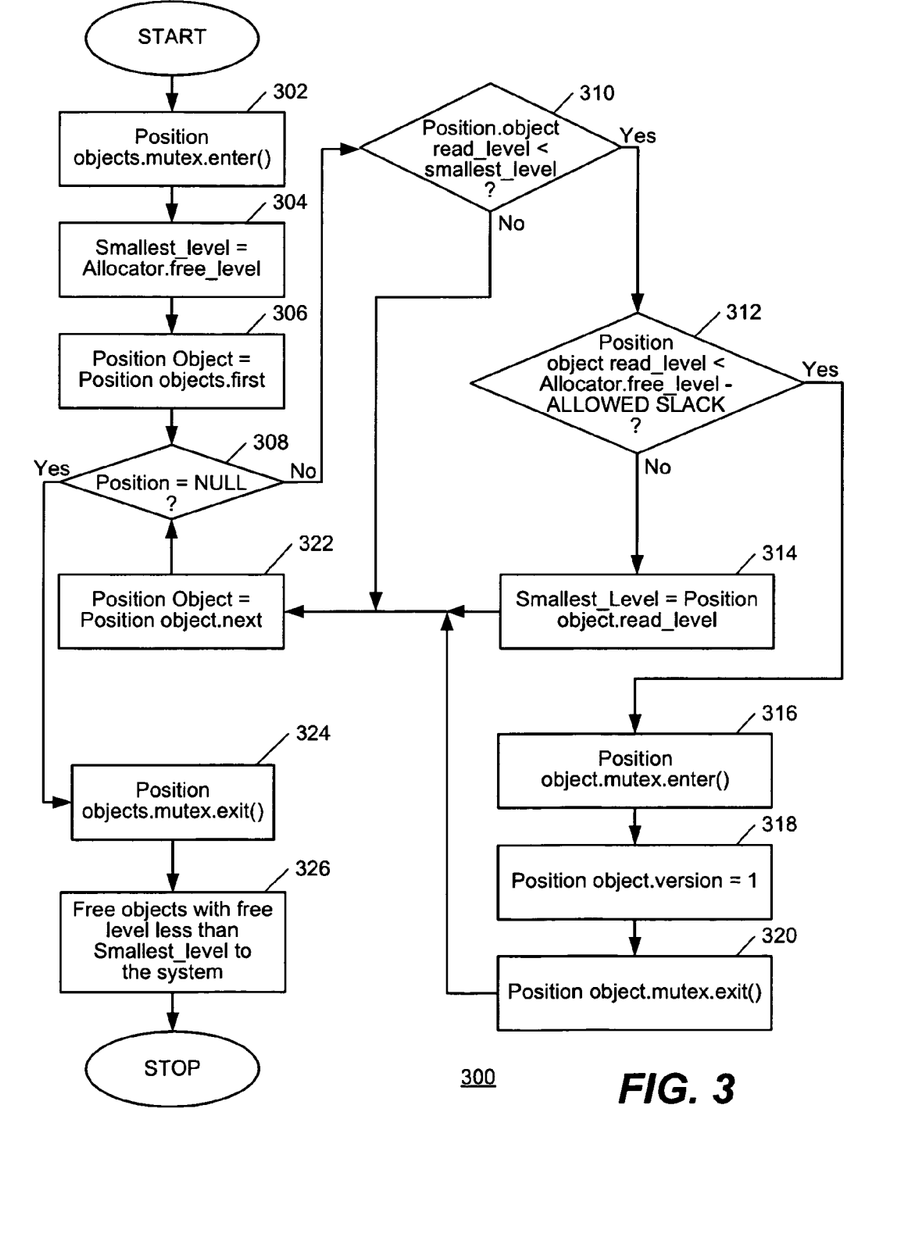
FIG. 3 is a flow chart of the memory allocator purge function.

FIG. 3 is a flow chart of a memory allocator purge function in accordance with an embodiment.

First, the system is initialized by mutexing the position objects list, via step 302, then causing the smallest level to be equal to the memory allocator free level, via step 304 and selecting a first position object on the position object list, via step 306.

Next it is determined if the position object does not exist, via step 308. If the position object does not exist, then the positions list mutex is released, via step 324, and the data objects with free levels that are less than the smallest level are freed to the system, via step 326. If the position object does exist, it is then determined if the position object read level is less than the smallest level, via step 310. If it is not, then the position object list is incremented to the next position object, via step 322, and then return to step 308.

If the position object is less than the smallest level, then it is determined if the position object read level is significantly smaller than the current allocator free level, via step 312. Significantly smaller means that the position object read level is less than the memory allocator free level minus an allowed_slack value. In an embodiment, the allowed_slack value represents the maximum allowed difference in a recycled data object's free level compared to the current free level, setting the maximum size for the recycle list.

If the position object read level is not significantly smaller than the allocator free level then the smallest level is equal to the position object read level, via step 314. On the other hand, if the smallest position object read level is significantly smaller than the free level, then the position object mutex is entered, via step 316. Thereafter, the position object version number is changed to one, via step 318, and the position object mutex is exited via step 320 and return to step 322.

Note that "freeing" and "freeing to the system" are two different things in this context. Freeing a piece of memory (ie, a data object) denotes freeing it to the memory allocator presented here. Freeing to the system is done within the presented memory allocator, and corresponds to free in traditional systems like malloc.

Figure 4A:
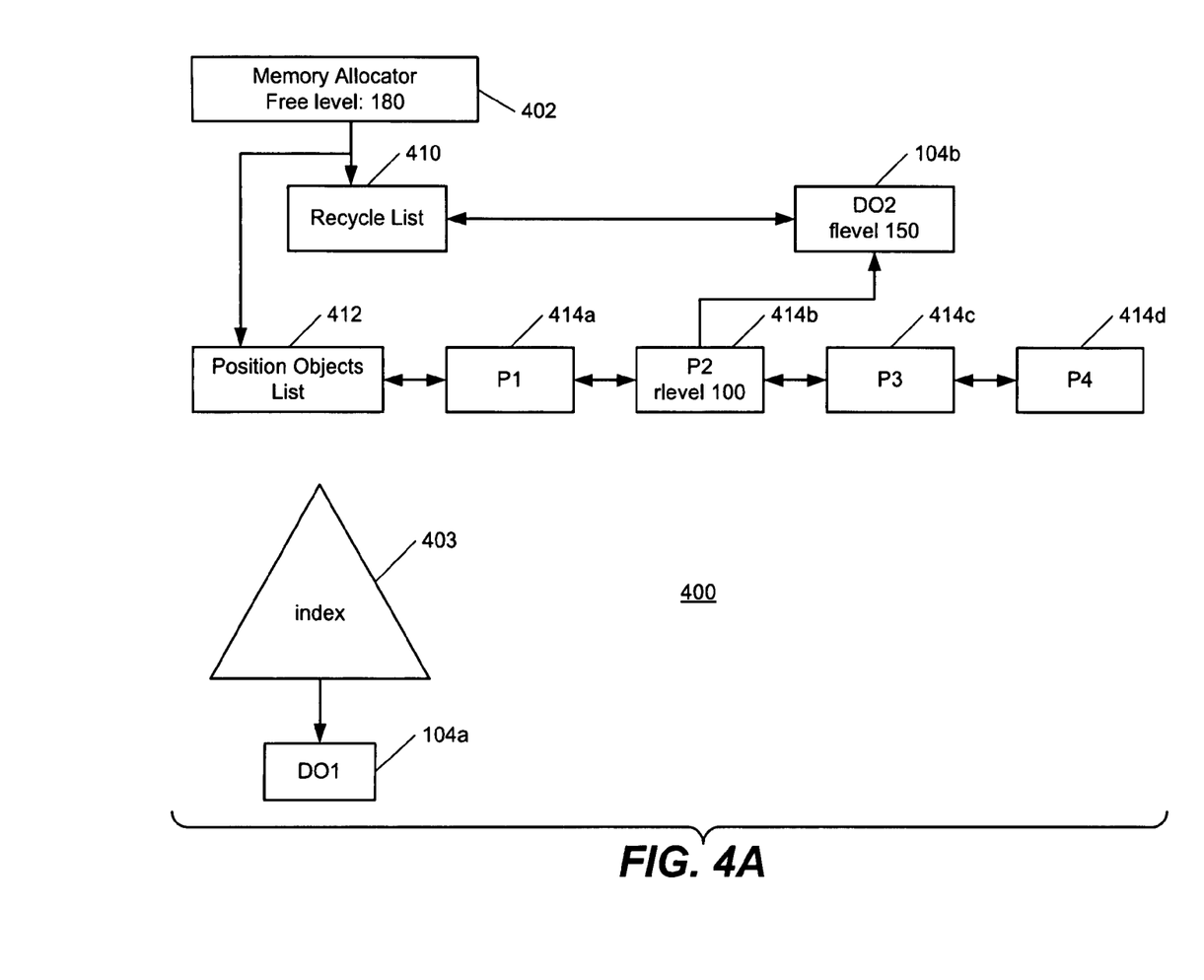
FIG. 4A-4E show examples of data layouts after accessing various data objects.

FIG. 4A shows an example of data layout 400 of a portion of the multiprocessor system 100. The memory allocator 402 has a free level of 180. Data object 104a is part of the live data of the system, accessible via the index 403. Data object 104b has been freed with free level 150 and is within the recycle list 410. In the position objects list 412, position object 414a is free, position object 414b with read level 100 still has a reference to data object 104b, position object 414c is free and position object 414d is free. The following illustrates the use of a system and method in accordance with the present invention in a particular example.

For a memory allocator process in accordance with the present invention, let us consider the data object 104a, and the position object 414a and position object 414b. Data object 104a represents a single row in a database, and position object 414a and position object 414b are used by SQL statement cursors to access the rows in a database. Position object 414a is associated with a read statement S1, and position object 414b is associated with an update statement S2.

Data Object Read Function

Figure 4B:
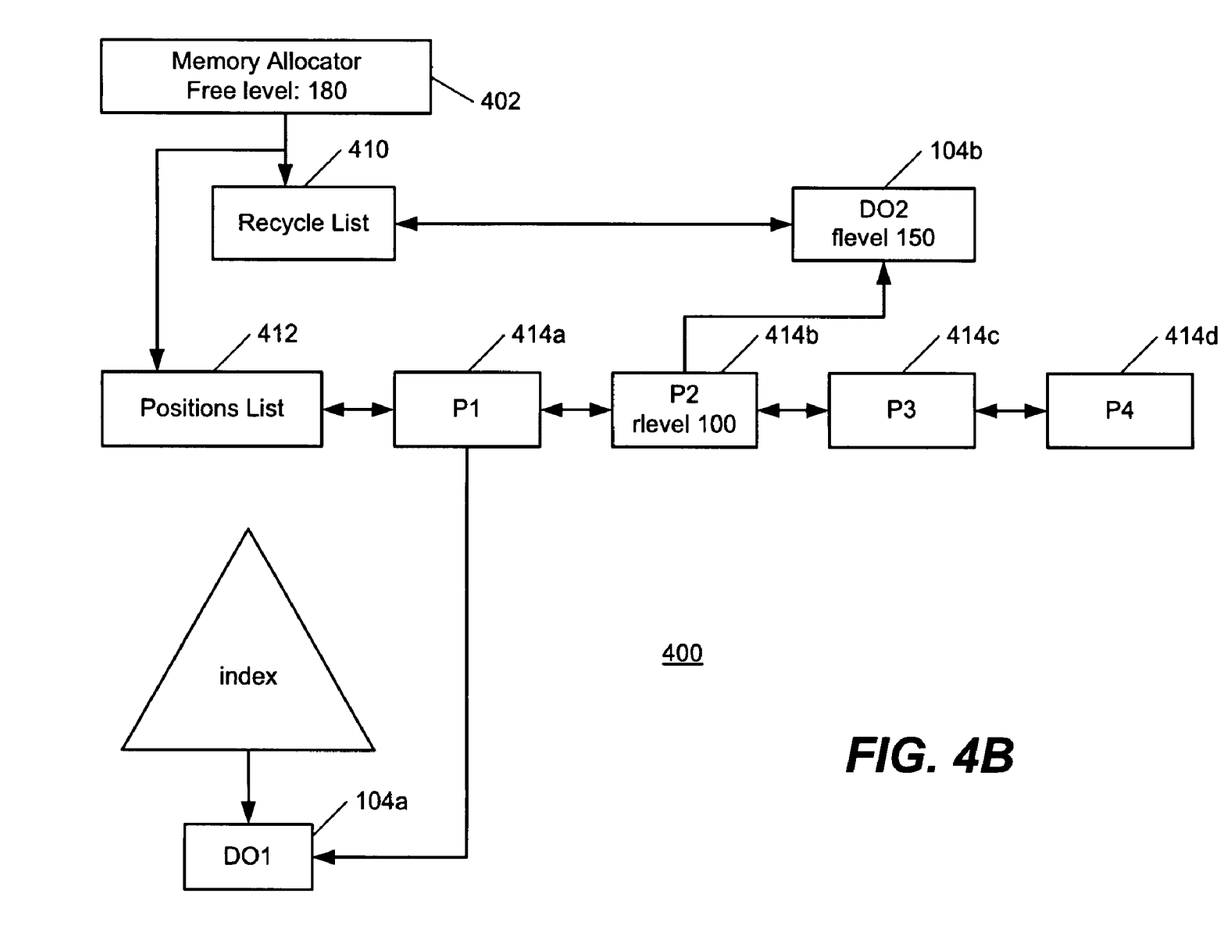

Let us assume position object 414a has been positioned on data object 104a that represents a row in S1's result set as shown in FIG. 4B. As the search is performed, position object 414a is mutexed, and positioned on data object 104a. The version number of data object 104a at this point is 10, and the memory allocator free level is 180, thus position object's 104a version numbering is 10 and the read level 180. Position object's 414a mutex is released while the result of the row represented by data object 104a is given to the user.

Figure 4C:
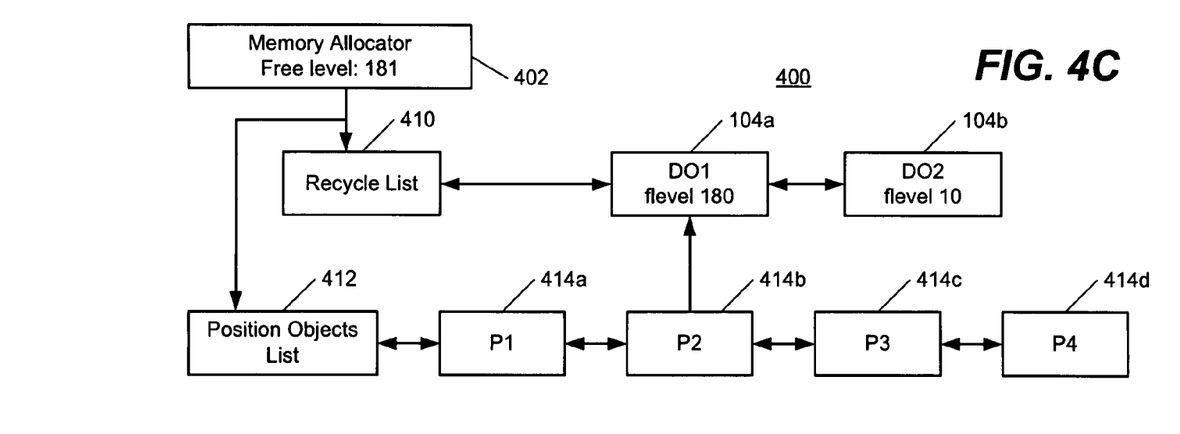

While the result is being returned, another thread performs the update statement S2 by using position object 414b, which frees data object 104a as shown in FIG. 4C. Data object 104a is placed into the memory allocator's recycle list 410 with free level 180, and the memory allocator's free level is increased to 181. The version number of data object also is increased to 11, and all other data but the version number on it becomes garbage.

Example 1

Figure 4D:
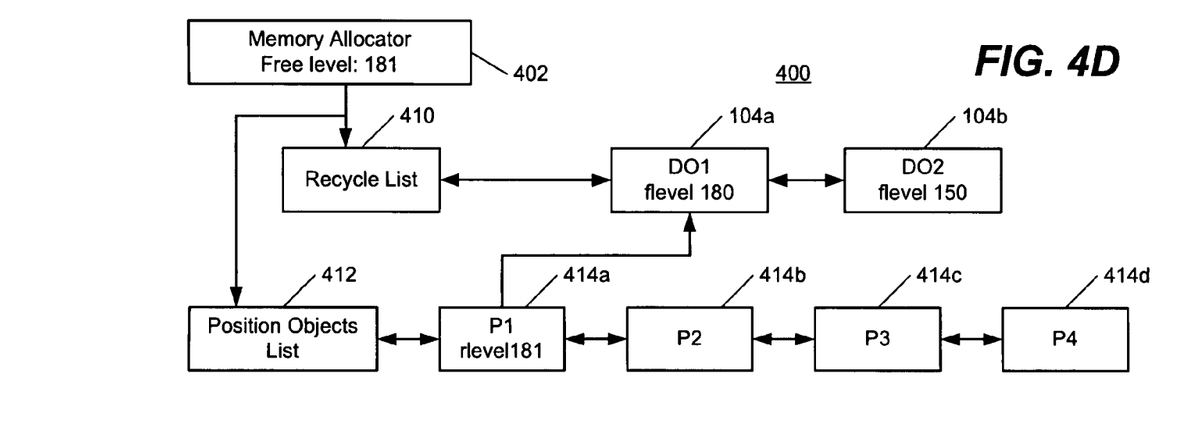

Now S1 proceeds in its result set, using position object 414a to access data object 104a again as shown in FIG. 4D. Position object 414a is mutexed, but when position object 414a checks its version number (10) against the version number of data object (11), now in the recycle list, it deems data object is no longer valid for position object 414a to access, and position object 414a is positioned again in the database by using a key value to logically search the next value of the result set. While doing so, position object 414a also updates its read level to 181. Position object 414a no longer holds a reference to data object 104a, and when the recycle list is purged, if no other position object has a read level of 180 or less, data object 104a may be freed from the recycle list 410 to the system.

Memory Allocator Purge Function

Example 2

Figure 4E:
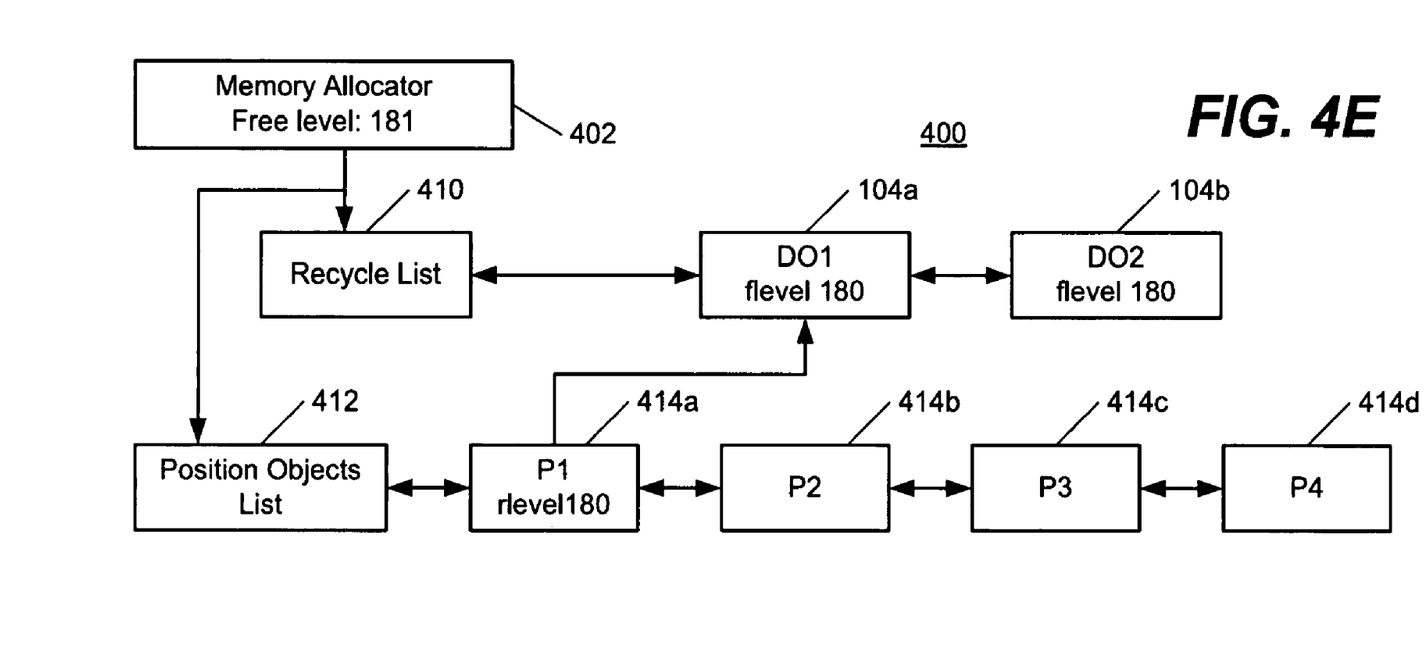

Further freeing of other data objects have been performed by other operations and the purging of the recycle list is triggered. As the position object list 412 is traversed, position object 414a is discovered to have the lowest read level 180 as shown in FIG. 4E. As data object 104a in the recycle list 410 has free level of 180, which is not lower than the lowest read level, it is still retained in the recycle list 410. Later on, S1 proceeds and uses position object 414a to access data object 104a again to proceed in the result set. As in example 1, the version number of position object 414a and data object 104a mismatch, and position object 414a is logically repositioned by key value. While data object 104a has been freed by S2 earlier, position object 414a's access to it is safe and a version number mismatch is discovered.

Example 3

After freeing of data object 104a, several other data objects have been freed into the recycle list and the list has become long. When a recycle list purge is triggered, the read level of position object 414a, still 180, is deemed to be too far behind of the current free level. The mutex of position object 414a is entered, the version number of position object 414a is set to 1, and the mutex of position object 414a is released. The read level of position object 414a is ignored. As the purge proceeds, frees the data object 104a back to the system. Later on, when S1 proceeds, it mutexes position object 414a and discovers that the version number of position object 414a is odd, and thus invalid, and repositions position object 414a by key value.

Example 4

Similar to example 2, data object 104a is freed to the recycle list 410. However, later on it is allocated as a new data object 104b representing different data in a different part of the system. As it is reallocated, its version number is increased to 12. When S1 proceeds to scan its result set, it mutexes position object 414a and checks its version number against the data object still pointed to by position object 414a, which is now data object 104b instead of data object 104a. As the version numbers mismatch, an invalid read is detected, and position object 414a is repositioned using key value. Thus it is safe to recycle data objects from the recycle list to new roles.

This method is beneficial for multiprocessor scalability, because mutex collisions are rare. Threads work with separate sets of position objects, and typically only the thread owning a position object mutexes it to access one or more data objects. In only example 3 above, a thread not owning position object 414a mutexes it, but this happens after position object 414a has been idle for some time, and it is unlikely that the thread owning position object 414a would access it at the same time.

Furthermore, this method keeps memory usage overhead to minimum by recycling data objects from the recycle list, thus allowing them to be reused for different purposes throughout the system. If the recycle list fills up despite this, the method of forcibly freeing data objects back to the system is presented.

A method and system in accordance with the present levels minimizes potential mutex collisions and thus provides for good multiprocessor scalability. The position object list is only mutexed for traversal and adding a new position object or removing an old one. As the position objects are kept static for each kind of operation (in particular, each prepared statement), the need to mutex this list mainly comes only from the traversing, which is only performed by one thread at a time.

The position objects are mutexed only by the threads that run the aforementioned operations, and rarely by the list traversal.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimistic access of data objects in a processing system comprising:
    utilizing a first thread to mutex a position object of a list of position objects and to associate the position object with a data object, wherein the position object contains a pointer pointing to the data object, and wherein the data object includes data;
    accessing the data object by the first thread;
    recording a free level of a memory allocator as a read level of the position object, and recording a version number of the data object as the version number of the position object after the access has been determined to be safe;
    freeing the data object by a second thread, whereupon the data object is placed within a recycle list, and wherein the freeing of the data object is at least partly concurrent with the accessing of the data object; and
    providing a purging function for, by operation of one or more computer processors, freeing data objects from the recycle list, comprising:
        traversing the list of position objects to determine a smallest read level of any of the position objects in the list of position objects; and
        freeing one or more data objects from the recycle list with free levels less than the determined smallest read level.

2. The method of claim 1, wherein each position object further comprises a version number denoting the last version number of a safe access to the data object, a read level and a mutex.

3. The method of claim 1, wherein the memory allocation includes a counter which increments based upon a freeing of a data object.

4. The method of claim 1, which includes releasing the mutex of the position object after access to the data object has been deemed safe.

5. The method of claim 1, wherein the memory allocator free level is increased by one and the data object is marked invalid for reading when the data object is freed.

6. The method of claim 1, wherein a data object placed within the recycle list is reallocated to a different part of the system, and the said data object's version number is increased.

7. The method of claim 1 wherein the purging function further comprises:
    determining if a read level of a first position object is less than the smallest read level;
    if the read level of the first position object is less than the smallest read level:
        determining whether the read level of the first position object is significantly smaller than the smallest read level;
        mutexing the first position object;
        invalidating the version number of the first position object; and
        exiting the mutex of the first position object.

8. A memory allocator system for use in a processing system, the memory allocator system comprising:
    a computer processor;
    a memory allocator, the memory allocator having a free level counter;
    a recycle list controlled by memory allocator, the recycle list including data objects that have been freed, wherein at least one of the data objects on the recycle list was freed by a second thread, and wherein the freeing of the data object was at least partly concurrent with an access of the data object by a first thread;
    a position object list, wherein one or more threads of the processing system are utilized to mutex a position object from the position object list and to associate the position object with a data object; wherein when the data object is accessed and deemed to be safe, the free level is recorded as a read level of the position object and a version number of the data object as the version number of the position object, wherein the position object contains a pointer pointing to the data object, and wherein the data object includes data; and
    a purging function for, by operation of the computer processor, freeing data objects from the recycle list, the purging function comprising:
        traversing the list of position objects to determine a smallest read level of any of the position objects in the list of position objects; and
        freeing one or more data objects from the recycle list with free levels less than the determined smallest read level.

9. The system of claim 8, wherein each position object further comprises a version number denoting the last version number of a safe access to the data object, a read level and a mutex.

10. The system of claim 8, wherein the mutex to the position object is released after access to the data object has been deemed to be safe.

11. The system of claim 8, wherein the memory allocator free level is increased by one and the data object is marked invalid for reading when the data object is freed.

12. The system of claim 8, wherein a data object placed within the recycle list is reallocated to a different part of the system, and the said data object's version number is increased.

13. The system of claim 8, wherein the purging function further comprises:
    determining if a read level of a first position object is less than the smallest read level;
    if the read level of the first position object is less than the smallest read level:
        determining whether the read level of the first position object is significantly smaller than the smallest read level;
        mutexing the first position object;
        invalidating the version number of the first position object; and
        exiting the mutex of the first position object.

14. A computer readable storage medium containing a program embodied therein, the program which, when executed, performs an operation for optimistic access of data objects in a processing system, the operation comprising:
    utilizing a first thread to mutex a position object of a list of position objects and to associate the position object with a data object, wherein the position object contains a pointer pointing to the data object, and wherein the data object includes data;
    accessing the data object by the first thread;

recording a free level of a memory allocator as a read level of the position object, and recording a version number of the data object as the version number of the position object after the access has been determined to be safe;

freeing the data object by a second thread, whereupon the data object is placed within a recycle list, and wherein the freeing of the data object is at least partly concurrent with the accessing of the data object; and providing a purging function for freeing data objects from the recycle list, the purging function comprising:

traversing the list of position objects to determine a smallest read level of any of the position objects in the list of position objects; and freeing one or more data objects from the recycle list with free levels less than the determined smallest read level.

15. The computer readable medium of claim 14, wherein each position object further comprises a version number denoting the last version number of a safe access to the data object, a read level and a mutex.

16. The computer readable medium of claim 14, wherein the purging function further includes:

determining if a read level of a position object level is less than the smallest level;

if the read level of the position object is less than the smallest level;

determining whether the position object level is significantly smaller than the smallest level;

mutexing the position object;

invalidating the version number of the position object; and exiting the position object mutex.

17. A processing system comprising:

a plurality of central processing units (CPUs);

a memory including a plurality of data objects in communication with the plurality of position objects;

a memory allocator mechanism, comprising:

a memory allocator, the memory allocator having a free level counter;

a recycle list controlled by memory allocator, the recycle list including data objects that have been freed, wherein at least one of the data objects on the recycle list was freed by a second thread, and wherein the freeing of the data object was at least partly concurrent with an access of the data object by a first thread;

a position object list, wherein one or more threads of the processing system are utilized to mutex a position object from the position object list and to associate the position object with a data object; wherein when the data object is accessed and deemed to be safe, the free level is recorded as a read level of the position object and a version number of the data object as the version number of the position object, wherein the position object contains a pointer pointing to the data object, and wherein the data object includes data; and a purging function for freeing data objects from the recycle list, the purging function comprising:

traversing the list of position objects to determine a smallest read level of any of the position objects in the list of position objects; and freeing one or more data objects from the recycle list with free levels less than the determined smallest read level.

* * * * *